United States Patent [19]

Kubát et al.

[11] 4,196,105

[45] Apr. 1, 1980

[54] RECOVERY OF POLYSTYRENE USING LIQUID SULFUR DIOXIDE

[76] Inventors: Josef Kubát, Solparksvägen 3, 171 35 Solna; Kaj B. Hedman, Olivedalsgaten 3, 413 10 Göteborg; Per L. Albihn, Övre Olskroksgatan 12, 416 67 Göteborg, Sweden

[21] Appl. No.: 888,155

[22] Filed: Mar. 17, 1978

[30] Foreign Application Priority Data

Mar. 17, 1977 [SE] Sweden .................. 7703084

[51] Int. Cl.² .............................................. C08J 11/04
[52] U.S. Cl. ..................................... 260/2.3; 528/487
[58] Field of Search ......................... 260/2.3; 528/487

[56] References Cited

U.S. PATENT DOCUMENTS

| | | | |
|---|---|---|---|
| 3,624,009 | 11/1971 | Sussman et al. | 260/2.3 |
| 3,666,691 | 5/1972 | Spiller | 260/2.3 |
| 3,793,235 | 2/1974 | Goebec | 260/2.3 |

FOREIGN PATENT DOCUMENTS 2639864  3/1977  Fed. Rep. of Germany.

OTHER PUBLICATIONS

C.A., 80, 108923u.

Primary Examiner—Stanford M. Levin
Attorney, Agent, or Firm—Haseltine, Lake & Waters

[57] ABSTRACT

A process and apparatus for separating and recovering polystyrene from polystyrene containing material wherein the polystyrene containing material is contacted with liquid sulfur dioxide wherein the polystyrene is dissolved and the system polystyrene-sulfur dioxide forms two phases, an upper phase which contains the polystyrene and a lower phase which contains the sulfur dioxide solvent which is practically free from polystyrene and which can be reused in the process, the polystyrene is recovered from the upper polystyrene containing phase by boiling off the sulfur dioxide, which if desired is returned to the process, optionally after removing low molecular portions of polystyrenes.

8 Claims, 6 Drawing Figures

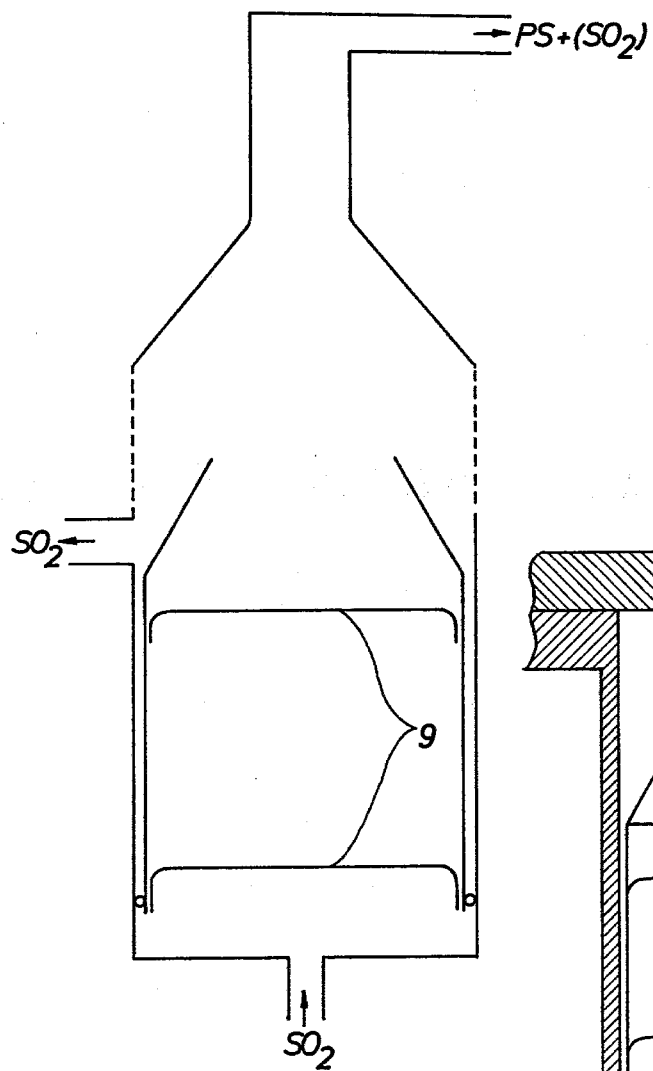
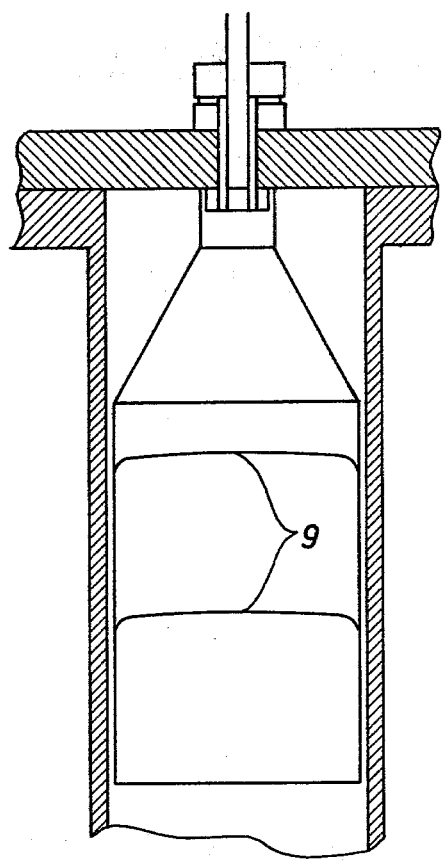

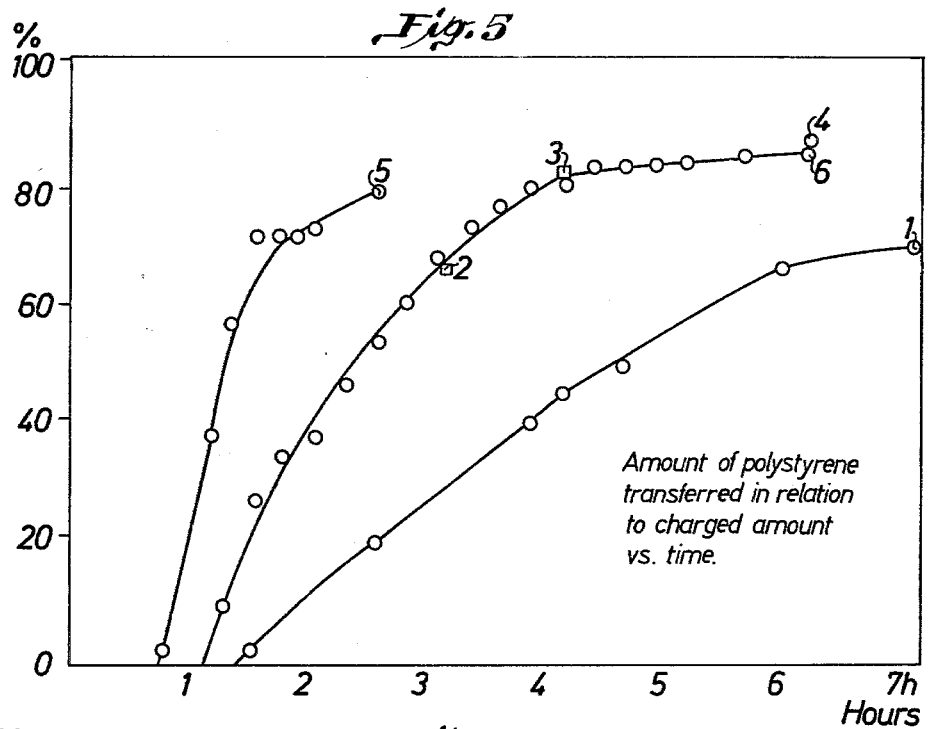
Fig. 5 — Amount of polystyrene transferred in relation to charged amount vs. time.
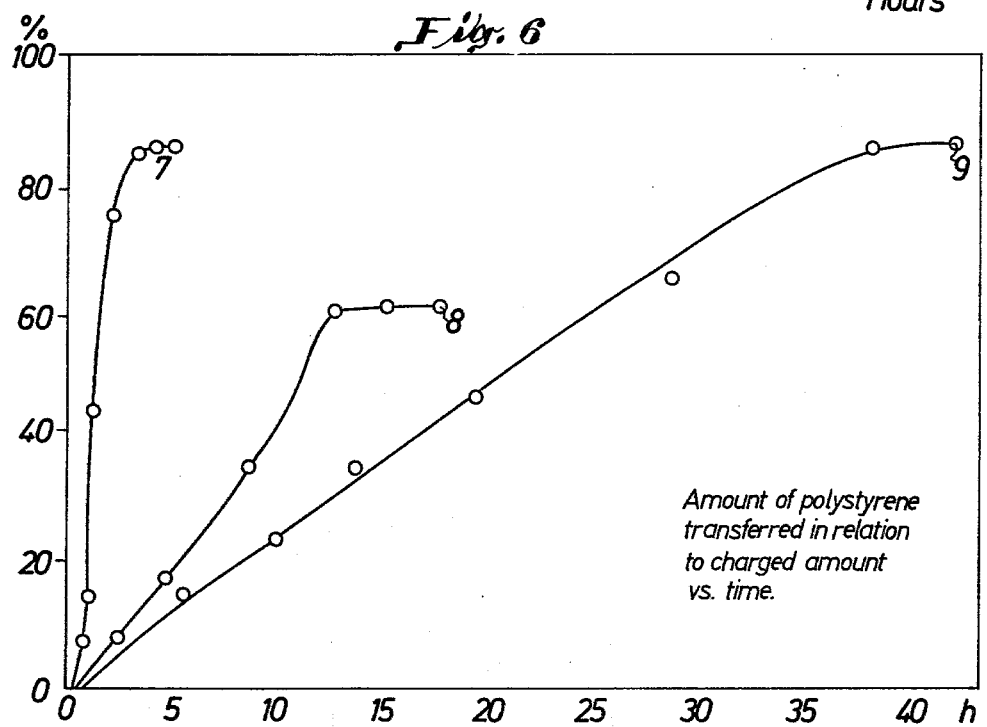
Fig. 6 — Amount of polystyrene transferred in relation to charged amount vs. time.

RECOVERY OF POLYSTYRENE USING LIQUID SULFUR DIOXIDE

The present invention relates to a process for separation and recovery of polystyrene from polystyrene containing material, for instance a mixed plastic waste or other waste containing polystyrene with the use of a cheap and effective solvent.

A great deal of the plastic waste at present is burned up together with other waste which often gives rise to troublesome flue gas products while simultaneously making great demands on incinerators and purification plants. A method of utilizing the energy supply in plastic waste which has been proposed is the use of pyrolysis but this has not been used in any large scale. The restricted natural resources in the world and the spiralling prices of raw materials means that there is a great interest and need of being able to utilize the plastic waste by means of effective and economic methods of separation and recovery.

According to the present invention a process for separating and recovering polystyrene from polystyrene containing material, for instance a blend of plastic waste, is provided, in which process an effective and cheap solvent is used which solvent consists of liquid sulfur dioxide. By means of the process according to the present invention it is possible directly to separate the polystyrene which then can be reused.

The process according to the present invention is useful for the separation and recovery of polystyrene from different types of waste materials such as plastic waste, domestic waste, hospital waste, industrial waste, etc. A polystyrene waste which is especially bulky and difficult to handle from which polystryene can be recovered by means of the process according to the present invention is expanded polystyrene, i.e., foamed polystyrene plastic. Such foamed plastic is extensively used as a protective packaging material and insulating material.

When separating and recovering polystyrene from waste mixtures the process can be incorporated as a stage in a process wherein waste is sorted into metal, glass, paper, plastic, etc. The process according to the present invention works even if no separation of plastic and non-plastic waste has been carried out but then requires longer run duration and gives a smaller yield. Thus, the process is very useful for plastic waste which has been sorted out from other waste.

In the process according to the present invention sulfur dioxide in liquid form is used as separating agent and solvent.

Sulfur dioxide is a gaseous substance at normal pressure and temperature conditions which has a boiling point at $-10°$ C. By pressuring the gas it can easily be converted into the liquid state and the process according to the present invention means that liquid sulfur dioxide is contacted with the polystyrene containing material whereby the polystyrene is dissolved and is carried with the sulfur dioxide. Thus, the liquid sulfur dioxide is an excellent and very cheap solvent for polystyrene which is commercially available to a price of less than one Swedish crown/liter.

Furthermore, in the process according to the present invention it has been found that the polystyrene which is dissolved by the sulfur dioxide forms two phases, via; an upper phase which consists of polystryene and sulfur dioxide, and a lower phase which contains practically pure sulfur dioxide. In the process according to the present invention the polystryene is separated from the polystyrene containing material by means of the liquid sulfur dioxide which dissolves the polystyrene and this is then carried to a second stage dissolved in the liquid sulfur dioxide in which stage the mixture is allowed to form phases. In this way an upper layer consisting of polystyrene and sulfur dioxide is formed together with a lower layer which consists of sulfur dioxide which can be drained off and returned to the process.

In the phase formation between the sulfur dioxide solvent and the polystyrene a mixture which contains more than about 30 percent by weight of polystyrene will become a single phase and the viscosity will increase with increasing polystyrene concentration in the single phase mixture.

In the process according to the present invention it is also possible to separate low molecular portions of polystyrene from the polystyrene rich upper phase by repeated extraction with pure $SO_2$. This can be accomplished in separate stages after the first recovery of polystyrene-rich phase. By means of such a procedure it has been possible to remove up to 3 percent by weight of low molecular polystyrene fractions. There are in principle no difficulties in separating the low molecular portions from the polystyrene-rich phase by utilizing the solution equilibrium which in respect to the low molecular fractions characterizes the cited system. By removing the low molecular portions essential advantages are obtained as to the property profile of the recovered polystyrene. Thus, for instance the tendency of the material to stress cracking is to a considerable extent dependent on the amount of low molecular portions.

The process according to the present invention can be carried out at temperatures within the range of from $-10°$ C. to $+95°$ C. and pressures within the range of from 0.1 to 2.5 MPa the pressure and temperature of course being dependent on each other and the critical temperature being 157° C. which thus is the upper temperature limit.

Usually, the temperature in the process according to the invention is maintained rather low, a suitable temperature range being from 20 to 70° C. and preferably a temperature within the range of from 20° to 60° C. is used. The higher temperature used the shorter the dissolving time required for dissolving the polystyrene. One of the advantages of the process according to the present invention is that no degradation of the polystyrene takes place since the temperature can be kept low, for instance below 60° C. The fact that no degradation takes place can easily be confirmed by simple experiments.

By means of the process according to the present invention a simple and rapid separation of polystyrene from the common thermoplastics polyvinylchloride, polyethylene, polypropylene, etc., is made possible.

After the dissolution of the polystyrene it is very easy to remove the sulfur dioxide from it.

BRIEF DESCRIPTION OF THE DRAWINGS

In the enclosed drawings FIG. 2 shows the preferred recovery plant. The dissolution and separation need not take place in two different containers but the whole process advantageously can be carried out in one single container suitably designed for said purpose. An example of such a container is illustrated in FIG. 3. Of course such a container also can be designed in another way and with other geometries if desired. FIG. 4 shows a cross-sectional view of an autoclave used in the recovery plant.

When carrying out the separation and recovery process according to the present invention the polystyrene containing material to be treated is placed between two metal nets 9 in the insert of the autoclave 1, cf. FIGS. 3 and 4. The insert can consist of a tube of polyproplene with a conical top which is connected with the top of the autoclave in leakproof manner.

From an autoclave 3, cf. FIGS. 1 and 2, liquid sulfur dioxide is pumped into the system. The autoclave 1 is completely filled and the autoclave 2 is filled to 75 percent with liquid sulfur dioxide. The valve 7 is opened and the valve 8 is closed. The pump 4 now circulates sulfur dioxide in the system the polystyrene in autoclave 1 gradually being dissolved and carried with the flowing sulfur dioxide to the autoclave 2 wherein the solution forms two layers. Through a connection in the bottom of the autoclave 2 the sulfur dioxide liquid is pumped back from the bottom layer to the autoclave 1.

Figure 1:
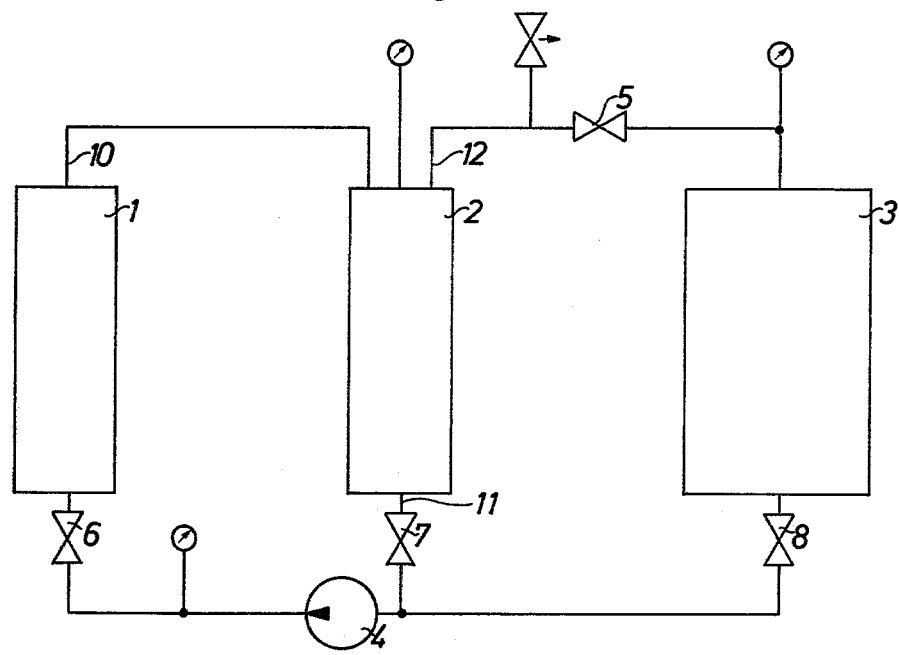
FIGS. 1 and 2 show diagrammatic sketches of separation and recovery plants for carrying out the process according to the present invention and of these

Then the polystyrene can be recovered by shutting off the pump and opening the valve 5. Then the sulfur dioxide remaining in the autoclaves 1 and 2 is allowed to boil and the gas then is passed to the autoclave 3 wherein it is condensed and stored for reuse. In this way more than 95% of the sulfur dioxide can be recovered and reused.

The polystyrene material in the autocalve 2 is discharged, further dried and weighed. By performing the process according to the present invention with the use of the above described procedure it has been possible to separate and recover about 90 percent of the polystyrene content of the starting material which thus has been transferred from the autocalve 1 to the autoclave 2.

The mechanical properties of the recovered polystyrene are not impaired by the dissolution in sulfur dioxide or by the subsequent recovery which is a great advantage of the process according to the present invention.

If a waste mixture which in addition to plastic materials also contains for instance such waste materials as paper and metal is used as a starting material, the paper and metal can be separated from the plastic mixture by means of several known methods such as sink-float separation, sedimentation process, air stream separation, vibrating separation, electrostatic separation, sticking by means of heat rolls, shrinking, etc., and these previously known methods preferably are used before the polystyrene containing waste material is subjected to the separation and recovery process according to the present invention. In addition to the polystyrene which is separately recovered it is possible in this way to obtain a plastic mixture which consists of one or more of the common thermoplastics polyethylene, polypropylene and polyvinylchloride to the extent these were included in the starting waste material.

These plastics which are not dissolved by sulfur dioxide absorb some sulfur dioxide which however escapes by diffusion. If these residual products (PP, PVC, PE) are treated for instance in an extruder the sulfur dioxide can be degassed very rapidly.

The invention is illustrated more specifically by means of the following examples in which all statements as to percent are based on weight if not otherwise indicated. The experiments illustrated in the examples have been carried out within a pressure range of from 0.5 to 1.0 MPa owing to the fact that the autoclaves and other equipment only could stand 2.0 MPa and certain safety margins were regarded as necessary. Another reason for the pressure range selected is that the viscosity at 55° C. (1.0 MPa) is 70 percent lower than at room temperature while a further increase of the temperature only gives slight decreases of the viscosity while the pressure is rapidly increasing. The experiments in examples 1–6 were carried out with the use of a recovery plant according to FIG. 1.

EXAMPLE 1

In this experiment 50 grams of polystyrene granules were used which were charged to the autoclave 1 between the metal nets 9, cf. FIG. 4. Furthermore, a conical insert having a diameter of 45 mm were used in the autoclave. The operating pressure in the system was 0.35 MPa, the temperature was 21° C. and the experiment was carried out for 420 minutes. 11.7 grams of polystyrene remained in the insert, 4.0 grams stock in the line while 34.3 grams (68%) were transferred to the autoclave 2.

The relatively small diameter of the conical insert and the fact that the polystyrene stuck and formed a clump extended parallelly with the flowing direction caused a small contact surface between the polystyrene and the sulfur dioxide.

EXAMPLE 2

In this experiment a conical insert according to FIG. 3 with an inner diameter of 78 mm was used. Starting material 50 grams of polystyrene granules. Operation pressure 0.5 MPa, temperature 32° C. and circulation time 180 minutes. 13.2 grams of polystyrene remained in the insert, 4.0 stuck in the line and 32.8 grams (65%) were transferred to the autoclave 2.

By the use of a conical insert with a larger diameter thus a more rapid transfer of the polystyrene was obtained or otherwise expressed, the necessary circulation time was reduced.

EXAMPLE 3

Starting material 50 grams of polystyrene granules, operation pressure 0.5 MPa, temperature 32° C. and circulation time 240 minutes. 6.1 grams of polystyrene remained in the insert, 3.2 grams stuck in the line while 40.7 grams (81%) were transferred to the autoclave 2.

The longer circulation time in this example thus increased the transferred amount of polystyrene as compared to example 2 in which in other respects the same conditions were used.

EXAMPLE 4

Starting material 70 grams of polystyrene granules, operations pressure 0.5 MPa, temperature 32° C. and circulation time 360 minutes. 6.9 grams of polystyrene remained in the insert, 3.5 grams stuck in the line while 59.6 grams (85%) were transferred to the autoclave 2.

From FIG. 5, which shows the results obtained in examples 1–6, it can be seen that the transferred amount of polystyrene per unit of time was low in the end of this experiment. After 4 hours 82% of the polystyrene was in the autoclave 2.

EXAMPLE 5

Starting material 70 grams of polystyrene granules, operation pressure 1.0 MPa, temperature 56° C. and circulation time 150 minutes. 11.9 grams of polystyrene remained in the insert, 4 grams stuck in the line while 54.1 grams (77%) were transferred to the autoclave 2.

The higher temperature as compared to example 4 caused the polystyrene to be transferred more rapidly to the autoclave in the present experiment.

EXAMPLE 6

Starting material 98.4 grams of 25 colored plastic spoons of polystyrene which were whole. Operation pressure 0.5 MPa, temperature 32° C. and circulation time 360 minutes. 14.7 grams of polystyrene remained in the insert, 4.5 grams stuck in the line while 79.2 grams (81%) were transferred to the autoclave 2.

Figure 2:
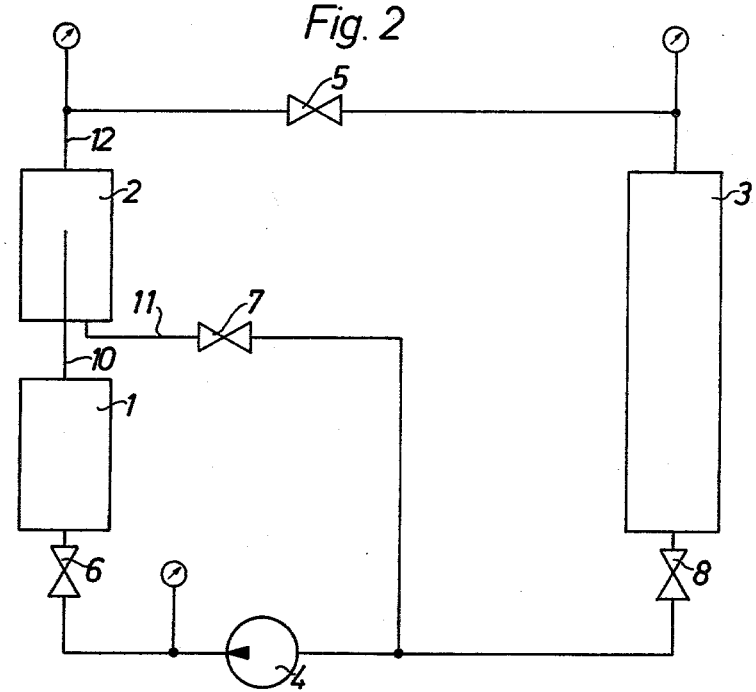

In order to further improve the yield a slight redesign of the recovery plant was made, cf. FIG. 2. In this case the autoclave 2 was positioned directly above the autoclave 1 and was connected with a tube of a length of 10 cm. In order to prevent back flow to the autoclave 1 upon completion of the experiment the connection tube extended about 10 cm up in the autoclave 2. By means of this redesign the following advantages were obtained: Shorter lines give rise to a smaller amount of plastic in the lines, forced circulation was unnecessary—the polystyrene flows by itself up through the tube to the upper liquid surface, the dissolved polystyrene does not contact gaseous sulfur dioxide during transfer to the autoclave 2.

With this recovery plant, which is shown in FIG. 2, the following three examples were performed.

EXAMPLE 7

Starting material 50 grams of polystyrene granules, operation pressure 0.6 MPa, temperature 35° C. and circulation time 310 minutes. 5.6 grams remained in the insert, 1 gram in the line while 43.4 grams (86.8%) were transferred to the autoclave 2.

From FIG. 6 it can be seen that the transferred amount of polystyrene per time unit was low towards the end of the experiment. Thus, after 3.5 hours 85% of the polystyrene was in the autoclave 2.

EXAMPLE 8

Starting material 32 grams of polystyrene granules (16 percent by weight) and 168 grams of polyethylene granules (84 percent by weight). Operation pressure 1.0 MPa, temperature 55° C. and circulation time 1,025 minutes. 10.7 grams of polystyrene remained in the insert, 1 gram in the line while 20.3 grams (63.4 percent by weight) were transferred to the autoclave 2.

The amount of polystyrene in the plastic mixture in the autoclave 1 thus decreased from 16 percent by weight to 6 percent by weight. 1.5 grams of the polystyrene which remained in the insert had been separated from the plastic mixture, which resulted in 9.2 grams of polystyrene (5.2 percent by weight) left in the plastic mixture.

From FIG. 6 it can be seen that the amount of transferred polystyrene per unit of time was low towards the end of the experiment. Thus, after 12 hours 60% of the polystyrene was in the autoclave 2.

EXAMPLE 9

The starting material consisted of a hypothetical domestic waste mixture of the following composition:

| | | | |
|---|---|---|---|
| 117.4 | grams of PE-granules | 29.5 | percent by weight |
| 6.2 | grams of PP-granules | 1.6 | |
| 33.3 | grams of PS-granules | 8.3 | |
| 10.4 | grams of rigid PVC-bars | 2.6 | |
| 23.8 | grams of soft PVC - sheets cut to pieces | 6.0 | |
| 5.0 | grams of PA 6-granules | 1.2 | |
| 2.4 | grams of PETP-granules | 0.6 | |
| 20.0 | grams of writing paper and board | 5.0 | |
| 180.0 | grams of metal scrap | 45.2 | |
| 398.5 | grams | | |

Operation pressure 1.0 MPa, temperature 55° C. and time 2610 minutes.

29.4 grams (89%) were transferred to the autoclave 2, which means that the polystyrene content of the waste mixture is reduced from 8.3% to 1.0%.

If the metal scrap and paper waste in the starting material are regarded as inert materials and are not included in the calculation the corresponding values of the plastic mixture in the autoclave 1 before and after the separation process are 16.7% and 1.9% respectively.

From FIG. 6 it can be seen that the transferred amount of plastic per unit of time was low towards the end of the experiment. After 35 hours 81% plastic was present in autoclave 2.

In this experiment no forced circulation was used but the plastic flowed by itself up to the surface in the autoclave 2. Furthermore, heat was applied essentially only to the autoclave 2 in order to prevent boiling and gas bubbles in the autoclave 1.

In summary it is to be noted as to the results obtained that the amont of polystyrene in the system is of some importance as to the result obtained since a thin plastic layer (about 0.1–0.2 millimeter thick) always was obtained on all surfaces. In larger autoclaves and with a more favorable geometry there should be no difficulties in obtaining still better results. Furthermore, by further reducing the viscosity and providing better flowing conditions it should also be possible to further improve the yield. Furthermore, it is possible to carry out the process in several steps and to extract the polystyrene successively. The results shown should only be regarded as preliminary. There should be no difficulties in obtaining an almost complete recovery in a technical scale.

The final separation of sulfur dioxide from the polystyrene is easy since the sulfur dioxide already boils at −10° C. and is easy to distill off.

FIG. 5 shows the results of the recovery experiments in examples 1–6 in which recovered amount has been plotted against time. In experiments 1, 5 and 6 also the recovered amount has been determined at different times during the course of the experiment.

The amount of recovered polystyrene was read by means of a cathetometer and then the values were calibrated against the weighed amount after the end of the experiment. Accuracy ±10%.

From the FIG. 5 it can be seen that it took about 1 hour for the first polystyrene to be transferred to the autoclave 2. This depends on the fact that it takes time for the polystyrene to be dissolved and furthermore, a thin layer of the polystyrene sticks to the walls of the insert and lines.

From the FIG. 5 it also can be seen that higher temperatures mean a more rapid transfer of the polystyrene, which depends on increased dissolution velocity and lower viscosity.

FIG. 6 shows the results of the recovery experiments in examples 7, 8 and 9, which have been carried out by means of the plant in FIG. 2. In all experiments the recovered amount has been determined at different times during the course of the experiments.

What we claim is:

1. A process for the recovery of polystyrene from polystyrene-containing starting material comprising the steps of (1) contacting the polystyrene-containing starting material with liquid sulfur dioxide whereby the polystyrene is dissolved and the polystyrene-sulfur dioxide system forms two layers, an upper layer which contains low and high molecular weight fractions of polystyrene and a lower layer which contains liquid sulfur dioxide which is practically free from polystyrene, said lower layer being reusable in the process and (2) boiling off the sulfur dioxide from the polystyrene-containing upper layer whereby the polystyrene is recovered.

2. The process according to claim 1 wherein the sulfur dioxide which is boiled off is recycled to the step (1) of the process.

3. The process according to claim 1 wherein low molecular weight fractions of polystyrene are removed from the polystyrene-containing upper layer.

4. The process according to claim 1 wherein the starting material comprises a mixture of plastic wastes.

5. The process according to claim 4 wherein the plastic wastes comprise thermoplastics selected from the group consisting of polyethylene, polypropylene and polyvinylchloride.

6. The process according to claim 1 wherein the starting material consists of polystyrene, thermoplastics, metal scraps and paper waste.

7. The process according to any one of claims 1 to 6 wherein step (1) is performed at a temperature within the range $-10$ to $95°$ C.

8. The process according to claim 7 wherein the temperature is within the range of from $20°$ to $70°$ C.

* * * * *